(12) United States Patent
Miley et al.

(10) Patent No.: US 8,526,560 B2
(45) Date of Patent: Sep. 3, 2013

(54) METHOD OF USING DEUTERIUM-CLUSTER FOILS FOR AN INTENSE PULSED NEUTRON SOURCE

(71) Applicant: NPL Associates, Inc., Champaign, IL (US)

(72) Inventors: George H. Miley, Champaign, IL (US); Xiaoling Yang, Urbana, IL (US)

(73) Assignee: NPL Associates, Inc., Champaign, IL (US)

( * ) Notice: Subject to any disclaimer, the term of this patent is extended or adjusted under 35 U.S.C. 154(b) by 0 days.

(21) Appl. No.: 13/672,134

(22) Filed: Nov. 8, 2012

(65) Prior Publication Data

US 2013/0064339 A1  Mar. 14, 2013

Related U.S. Application Data

(63) Continuation-in-part of application No. 13/414,300, filed on Mar. 7, 2012, which is a continuation-in-part of application No. 12/080,011, filed on Mar. 31, 2008, now Pat. No. 8,227,020.

(60) Provisional application No. 60/920,659, filed on Mar. 29, 2007.

(51) Int. Cl.
   *H01J 49/06* (2006.01)
   *H01J 3/00* (2006.01)

(52) U.S. Cl.
   USPC .................... 376/108; 376/109; 250/424

(58) Field of Classification Search
   USPC .............. 376/100, 108, 109; 250/423 R, 424
   See application file for complete search history.

(56) References Cited

U.S. PATENT DOCUMENTS

| | | | |
|---|---|---|---|
| 6,680,480 B2 * | 1/2004 | Schoen | 250/423 R |
| 8,269,189 B2 * | 9/2012 | Ma et al. | 250/423 R |
| 2011/0260043 A1 * | 10/2011 | Dent | 250/251 |
| 2011/0273708 A1 * | 11/2011 | Tong | 356/312 |

OTHER PUBLICATIONS

Bernard et al., "The dense plasma focus—A high intensity neutron source," Nuclear Instruments and Methods, vol. 145(1), pp. 191-218 (1977).

Davis et al., "Rotating target neutron source II: Progress report," Preprint UCRL 78053, pp. 1-12 (Sep. 1976).

(Continued)

*Primary Examiner* — Frank Lawrence, Jr.
(74) *Attorney, Agent, or Firm* — Drinker Biddle & Reath LLP

(57) ABSTRACT

A method is provided for producing neutrons, comprising: providing a converter foil comprising deuterium clusters; focusing a laser on the foil with power and energy sufficient to cause deuteron ions to separate from the foil; and striking a surface of a target with the deuteron ions from the converter foil with energy sufficient to cause neutron production by a reaction selected from the group consisting of D-D fusion, D-T fusion, D-metal nuclear spallation, and p-metal. A further method is provided for assembling a plurality of target assemblies for a target injector to be used in the previously mentioned manner. A further method is provided for producing neutrons, comprising: splitting a laser beam into a first beam and a second beam; striking a first surface of a target with the first beam, and an opposite second surface of the target with the second beam with energy sufficient to cause neutron production.

35 Claims, 8 Drawing Sheets

(56) References Cited

OTHER PUBLICATIONS

Davis et al., "Angular distribution of neutrons from high-intensity laser-target interactions," Plasma Physics and Controlled Fusion, vol. 50(6), pp. 1-16 (2008).

Hatchett et al., "Electron, photon, and ion beams from the relativistic interaction of Petawatt laser pulses with solid targets," Physics of Plasmas, vol. 7(5), The 41st annual meeting of the division of plasma physics of the American Physical Society, Seattle, Washington, USA, pp. 2076-2082 (May 2000).

Jones et al., "Development of high quality titanium-tritide targets for the rotating target neutron source," J. Vac. Sci. Technol., vol. 17(5), pp. 1225-1232 (1980).

Krushelnick et al., "Energetic proton production from relativistic laser interaction with high density plasmas," Physics of Plasmas, vol. 7(5), The 41st annual meeting of the division of plasma physics of the American Physical Society, Seattle, Washington, USA, pp. 2055-2061 (May 2000).

Logan et al., "Radiation damage at the rotating target neutron source (RTNS-I) facility at Lawrence Livermore Laboratory," UCRL-52093, pp. 1-67 (Aug. 9, 1976).

Maekawa et al., "First neutron production utilizing J-PARC pulsed spallation neutron source JSNS and neutronic performance demonstrated," Nuclear Instruments and Methods in Physics Research Section A: Accelerators, Spectrometers, Detectors and Associated Equipment, vol. 620(2-3), pp. 159-165 (2010).

Maksimchuk et al., "Forward Ion Acceleration in Thin Films Driven by a High-Intensity Laser," Physical Review Letters, vol. 84(18), pp. 4108-4111 (May 2000).

Petrov et al., "Energy and angular distribution of deuterons from high-intensity laser-target interactions," Plasma Physics and Controlled Fusion, vol. 50(6), pp. 1-21 (2008).

Ramirez et al., "Pulsed power applications to intense neutron source development," Nuclear Instruments and Methods, vol. 145(1), pp. 179-183 (1977).

Rout et al., "Battery powered tabletop pulsed neutron source based on a sealed miniature plasma focus device," Journal of Physics D: Applied Physics, vol. 41(20), pp. 1-5 (2008).

\* cited by examiner

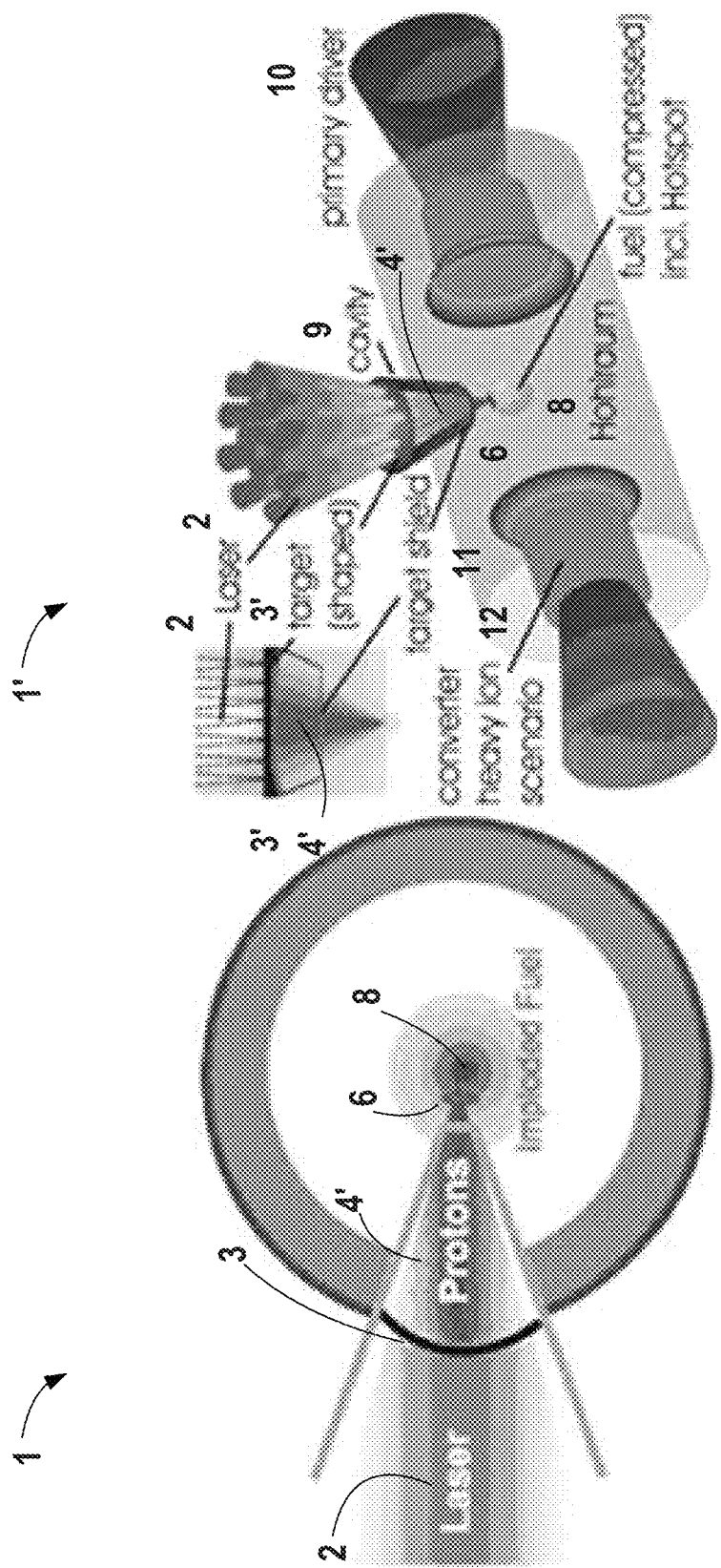

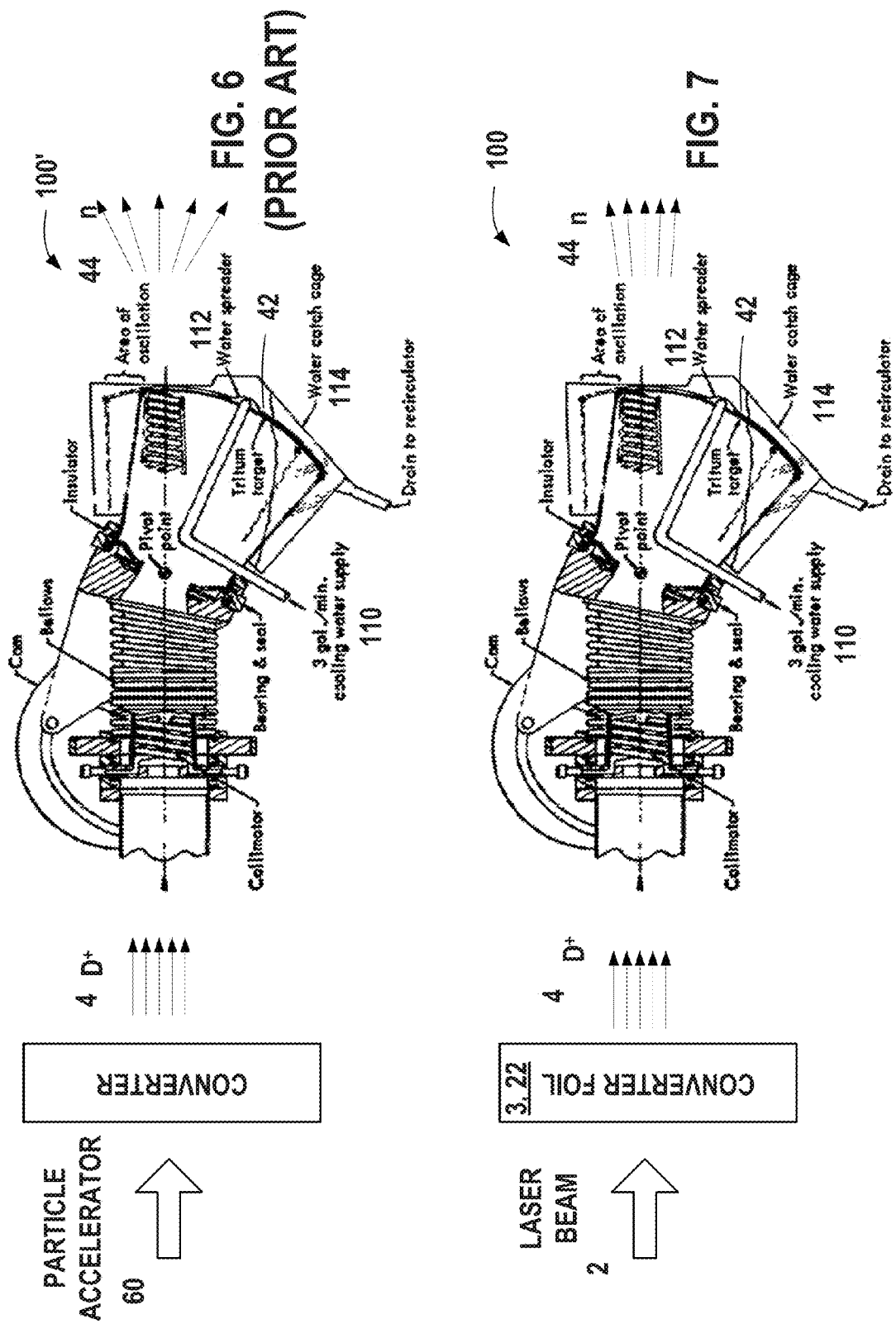

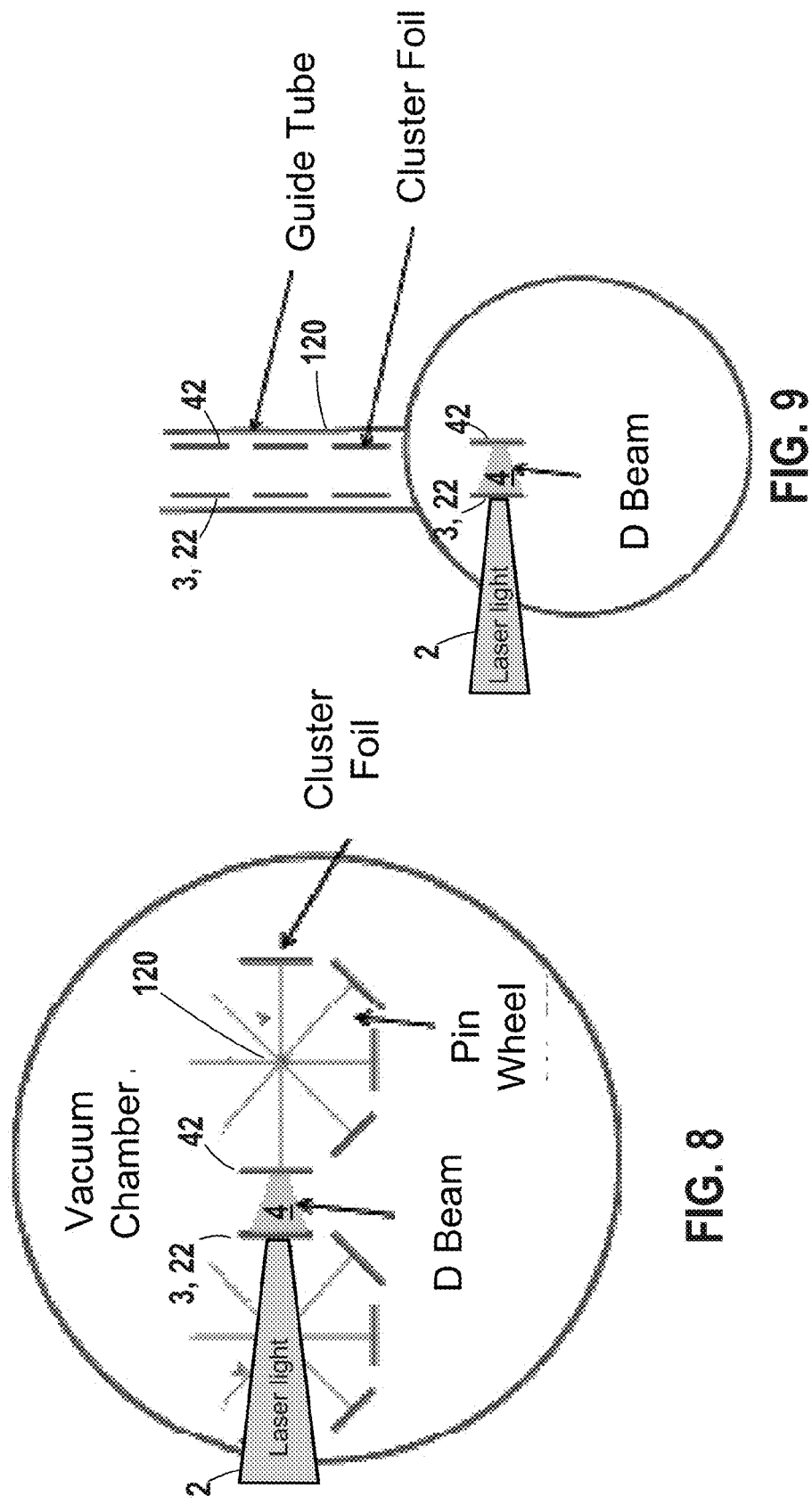

METHOD OF USING DEUTERIUM-CLUSTER FOILS FOR AN INTENSE PULSED NEUTRON SOURCE

CROSS-REFERENCE TO RELATED APPLICATIONS

The present application is a continuation-in-part application of U.S. patent application Ser. No. 13/414,300, filed Mar. 7, 2012 which is a continuation-in-part of U.S. patent application Ser. No. 12/080,011, filed Mar. 31, 2008, now U.S. Pat. No. 8,227,020, which claims the benefit of U.S. Provisional Patent Application No. 60/920,659 filed Mar. 29, 2007, each of these Related Applications being hereby incorporated by reference in their entirety.

STATEMENT REGARDING FEDERALLY SPONSORED RESEARCH OR DEVELOPMENT

Parts of this invention may have been made with government support under DE-SC0006355-STTR awarded by the Office of Science (STTR) of the U.S. Dept. of Energy. The government may have certain rights in the invention.

BACKGROUND

The present application relates to a system and method for using deuterium (or proton) cluster (D- or p-cluster) technology for thin films as an intense pulsed neutron source.

The use of a film or foil as a source of particles when struck by a laser has been considered by several researchers with respect to fast ignition (FI) fusion. FIG. 1 illustrates a previously proposed proton-driven fast-ignition system 1 in which a petawatt laser 2 is focused on a backside (laser-facing side) of converter foil 3 to create an energetic ion beam (here, protons). As shown in FIG. 1, the protons 4' come from a hydrogenous coating on the converter foil 3 surface. The protons 4' create a hot spot 6 that within a pre-compressed fuel pellet 8 containing deuterium and tritium. Fusion reactions created in the hot spot heat up the remaining compressed fuel, causing it to fuse as well.

FIG. 2 illustrates a Hohlraum-based proton fast ignition concept. In this design, the laser 2 is focused on a target (shaped) foil 3', which directs the protons 4' against a pre-compressed fusion fuel pellet formed via x-ray compression within the Hohlraum, creating a hot spot 6 that initiated fusion reaction that spread ("propagate") throughout the fusion fuel within the pellet.

Following early experiments on laser-acceleration of electrons, protons and carbon ions for fast ignition, some studies were performed, including those described in Hatchett, S. P., et al. Electron, photon, and ion beams from the relativistic interaction of Petawatt laser pulses with solid targets. in The 41st annual meeting of the division of plasma physics of the american physical society. 2000. Seattle, Wash. (USA): AIP; Maksimchuk, A., et al., *Forward Ion Acceleration in Thin Films Driven by a High-Intensity Laser.* Physical Review Letters, 2000. 84(18): p. 4108; and Krushelnick, K., et al. Energetic proton production from relativistic laser interaction with high density plasmas. in The 41st annual meeting of the division of plasma physics of the american physical society. 2000. Seattle, Wash. (USA): AIP.

These studies considered an accelerated deuteron beam to improve the ability of focusing on the hot spot volume. However, problems with making a suitable deuteron containing converter foil hampered these studies. These problems have now been addressed in the use of a "cluster" type deuterated converter foil technique for FI, as described in the Related Application section, and this design appears to be a very valuable approach to ion-beam driven FI. However, the use of cluster-type deuterated foils to create a neutron source for neutron beams has not previously been considered.

Historically, pulsed neutron beams have been used for a variety of applications, including medical isotope production, medical irradiations, and study of neutron damage to materials. Such neutron beams may also be applied in an increasing manner to homeland security uses. In the past, concepts for a source of such pulsed neutron beams have generally relied on accelerator-target concepts or on plasma discharges such as those produced by a dense plasma focus device. Due to the relatively low ion currents achieved with an accelerator and inefficiencies in plasma methods, resulting neutron source strengths are limited.

To increase yields, advanced plasma focus designs and high current diode accelerators that provide higher ion currents have also been studied. Alternatively, an ion and target combination to provide a spallation neutron source has been studied. For example, proton beams have been accelerated by a Synchrotron onto a heavy metal target, such as mercury or tungsten target, to produce neutrons with an energy spectrum of average energy of about 5 MeV neutrons. Currently, this approach offers about $10^{14}$-$10^{15}$ protons per pulse at the target, and receives about a $10^{12}$ neutron per pulse yield. However, better sources of neutrons are desirable.

SUMMARY

The present application discloses a method for using a proton- or deuterium-cluster (p- or D-cluster) foil (as described in the Related Applications for possible use in a deuterium-based ion fast ignition (FI) Inertial Confinement Fusion (ICF) system that produces fusion power) to produce a very high (multi-MeV) energy proton or deuteron beam, resulting in a forward-favored angular distribution neutron pulse of large intensity (directional pulsed neutron source).

As can be seen in FIG. 3, the converter foil technique uses a high-energy laser, such as a petawatt laser, focused on the backside of the foil to create the energetic ion beam 4 made of protons or deuterons. A thin layer of deuterated coating could be used for deuteron beam generation. However, such an approach faces similar flux initiation problems as are encountered in proton beam work where the ions capable of extraction are exhausted quickly, limiting the beam intensity. An alternative way (which may be employed here) is to use a more volumetric-like loading of the deuterium, so that the source for the accelerated ions is not limited to the surface, avoiding the ion exhaustion problem already noted. The cluster type foil offers such a volumetric source which is the subject of the present disclosure.

In our approach, a method for volumetrically loading the foil uses creation of proton or deuterium clusters (p- or D-clusters) in the foil. This relies on a formation of ultra-high density proton or deuterium clusters in defects in thin film palladium, as discussed in the Related Applications. The clusters can be identified using both superconducting quantum interference device (SQUID) measurements and a temperature programmed desorption (TPD) technique. In related experiments, ultra-dense deuterium (or inverted Rydberg matter) was found at the surface of iron oxide. These experimental results indicate that condensed state deuterium clusters with densities as high as $10^{24}/cm^3$ can be created in certain types of material defects. These required defects and corresponding D-clusters can be produced in multi-layer palladium-palladium-oxide foils, and these foils are usable as a high intensity energetic (multi-MeV) deuteron beam. When this beam is directed onto a deuterated (D) and/or a tritiated (T) target foil, the resulting fusion reactions (D-D and D-T) create an intense source of 2.45- or 14.1-MeV neutrons, respectively. This target foil can be composed of a metallic, plasma, or non-metallic material containing adequate D or T. One embodiment would use another "cluster" type foil similar to the one used for deuteron beam generation. Because the deuterium beam energies causing the neutron producing reactions approach the neutron energies, conservation of momentum shows that the neutron source angular distribution will be roughly a forward-directed cosine distribution. This forward biased distribution is favorable for many applications and is not available from most fusion neutron sources that typically employ much lower deuteron-beam energies. Some other sources, e.g., a spallation source, also offer biased angular distributions, but are limited to a neutron energy spectrum different from fusion sources. Although a preferred embodiment utilizes a metallic foil, non-metallic foils can also be utilized.

Thus, a method is provided for producing neutrons, comprising: providing a converter foil comprising deuterium clusters; focusing a laser on the converter foil with power and energy sufficient to cause deuteron ions to separate from the converter foil; and striking a surface of a target with the deuteron ions from the converter foil with energy sufficient to cause neutron production by a reaction selected from the group consisting of a D-D fusion reaction, a D-T fusion reaction, a D-metal nuclear spallation reaction, and a p-metal reaction.

A further method is provided for producing neutrons, comprising: providing a converter foil comprising proton clusters; focusing a laser on the converter foil with power and energy sufficient to cause proton ions to separate from the converter foil; and striking a surface of a target with the protons from the converter foil with energy sufficient to cause neutron production by a proton-metal reactions.

A further method is provided for assembling a plurality of target assemblies for a target injector, comprising: producing a plurality of targets comprising at least one of deuterium and proton clusters; affixing a holder to each of the plurality of targets; attaching each holder to an end of an arm; and assembling a plurality of the arms to extend from a central attachment portion in a pin-wheel manner.

A further method is provided for assembling a plurality of target assemblies for a target injector, comprising: producing a plurality of targets comprising at least one of deuterium and proton clusters; affixing a holder to each of the plurality of targets; and providing a guide tube through which the plurality of holders are configured to be provided to the target injector.

A further method is provided for producing neutrons, comprising: splitting a laser beam into a first beam and a second beam; striking a first surface of a target with the first beam, and an opposite second surface of the target with the second beam with energy sufficient to cause neutron production by a reaction selected from the group consisting of a D-D fusion reaction, a D-T fusion reaction, a D-metal nuclear spallation reaction, and a p-metal reaction.

DESCRIPTION OF THE DRAWINGS

Various embodiments of the invention are illustrated in the drawings and described in more detail below:

FIG. 1 is a pictorial illustration of a known use of a laser to generate protons for an FI system;

FIG. 2 is a pictorial illustration of a known Hohlraum-based proton FI concept;

FIG. 6 is a block pictorial diagram illustrating a known target system Rotating Target Neutron System (RTNS);

FIG. 7 is a block pictorial diagram illustrating an exemplary new target system;

FIG. 8 is a pictorial diagram illustrating a pin wheel-based design;

FIG. 9 is a pictorial diagram illustrating a guide tube based diagram;

DETAILED DESCRIPTION

Figure 4:
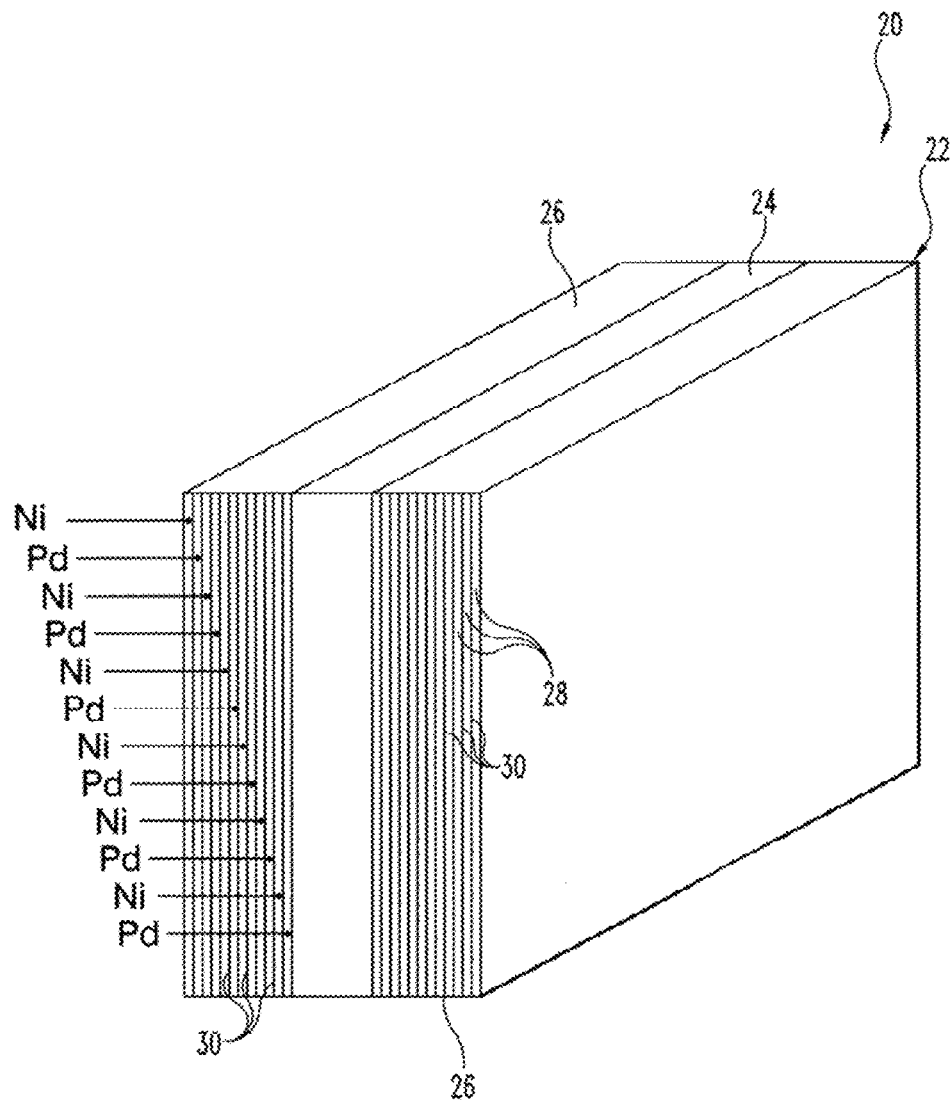
FIG. 4 is a perspective view of an exemplary layer composition and structure for a thin-film deuterium cluster foil.

FIG. 4 discloses the structure of an exemplary foil (further described in cross-referenced application Ser. No. 12/080,011 (the '011 Application)) that may be used in a neutron source system (note that a "system" consists of the pulsed laser, the converter foil it strikes to produce an ion beam, and the target that the ions hit to produce neutrons). As disclosed in FIG. 4 and the '011 Application, an exemplary embodiment of a multilayer thin film device 20 with a thin film 22 comprising two multilayer thin film stacks 26 on opposite sides of base/substrate 24. Each stack 26 includes alternating inner layers 28 of different types of metals designated as palladium (Pd) and nickel (Ni), respectively. Between each inner layer 28 of Pd and Ni, a Pd/Ni interface 30 is formed, only a few of which are specifically designated to preserve clarity. In one form, the base 24 is fabricated from stainless steel or aluminum; however, other materials may be used in different embodiments.

Figure 3:
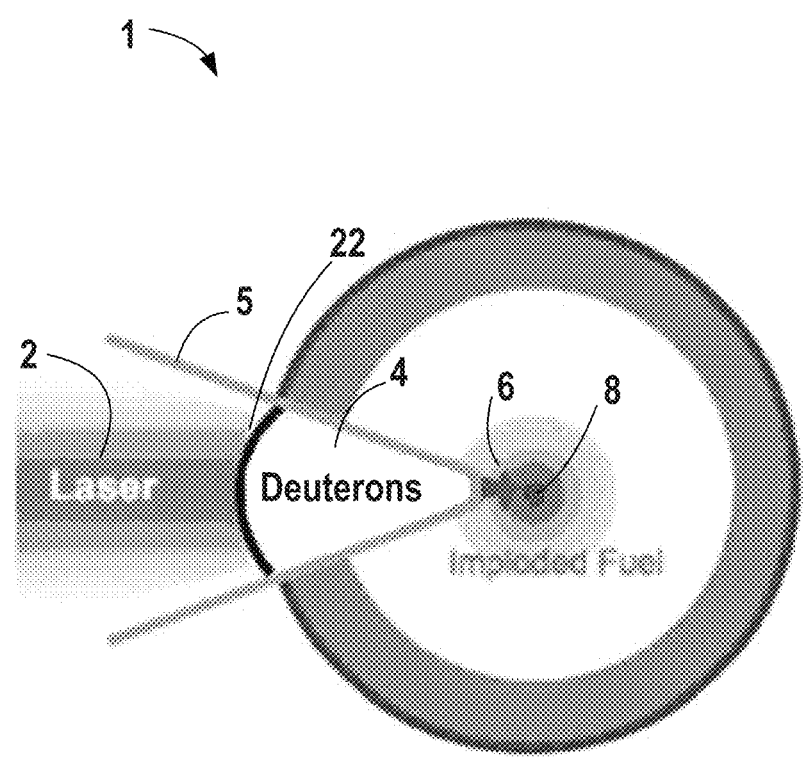
FIG. 3 is a pictorial illustration of using a laser to generate deuterons for an FI system.

In one alternative embodiment, the alternating inner layers 28 are of two dissimilar metallic materials. In a further embodiment, the alternating layers 28 are a metal and an oxide of metal, such as alternating inner layers of Pd and PdO. In another form, one layer 28 for each interface 30 is comprised of a material that readily forms a hydride and the other layer 28 for such interface 30 is comprised of material in which isotopes of hydrogen are readily accepted. By way of a non-limiting example, Pd and Ti readily form hydrides and Ni readily accepts hydrogen loading. In still another form, one of the alternating inner layers 28 includes one of the group consisting of Pd, Ti, Ni, Li, Au, Ag, U, and alloys thereof, and the other of the alternating inner layers 28 includes a different one of this group. This form is intended to include 10 alternating layers each comprised of a different alloy of Pd, Ti, Ni, Li, Au, Ag, and/or U. As shown in FIG. 3, such a foil could serve as a source of deuterons in an FI system—however, the FI system is not the focus of the present application.

The high intensity deuteron beam observed from a high power laser interaction with the D-cluster foils can also be used as a basis of a new type of high intensity pulsed neutron source. Although a high power laser in the petawatt range able to deliver 10 kJ/pulse is the base for experimental investigation given its high yield of neutrons, even higher power lasers with more energy per pulse could provide yet higher neutron yields—conversely, lasers in a much more modest capability (such as 1 kJ/pulse or even 100 J/pulse) could be utilized in applications that can employ lower neutron yields. The neutrons produced are in proportional to or scaled to the power supplied above a threshold (the threshold relating to the ability of laser to drive electrons from the converter foil 3, as described below). The deuterium beam intensity is also a function of the packing fraction (the volumetric density of deuterium clusters in the foil) and the thickness of the foil.

Proton clusters can be used to produce energetic proton beams for a neutron source based on proton induced nuclear reactions producing neutrons.

Figure 5:
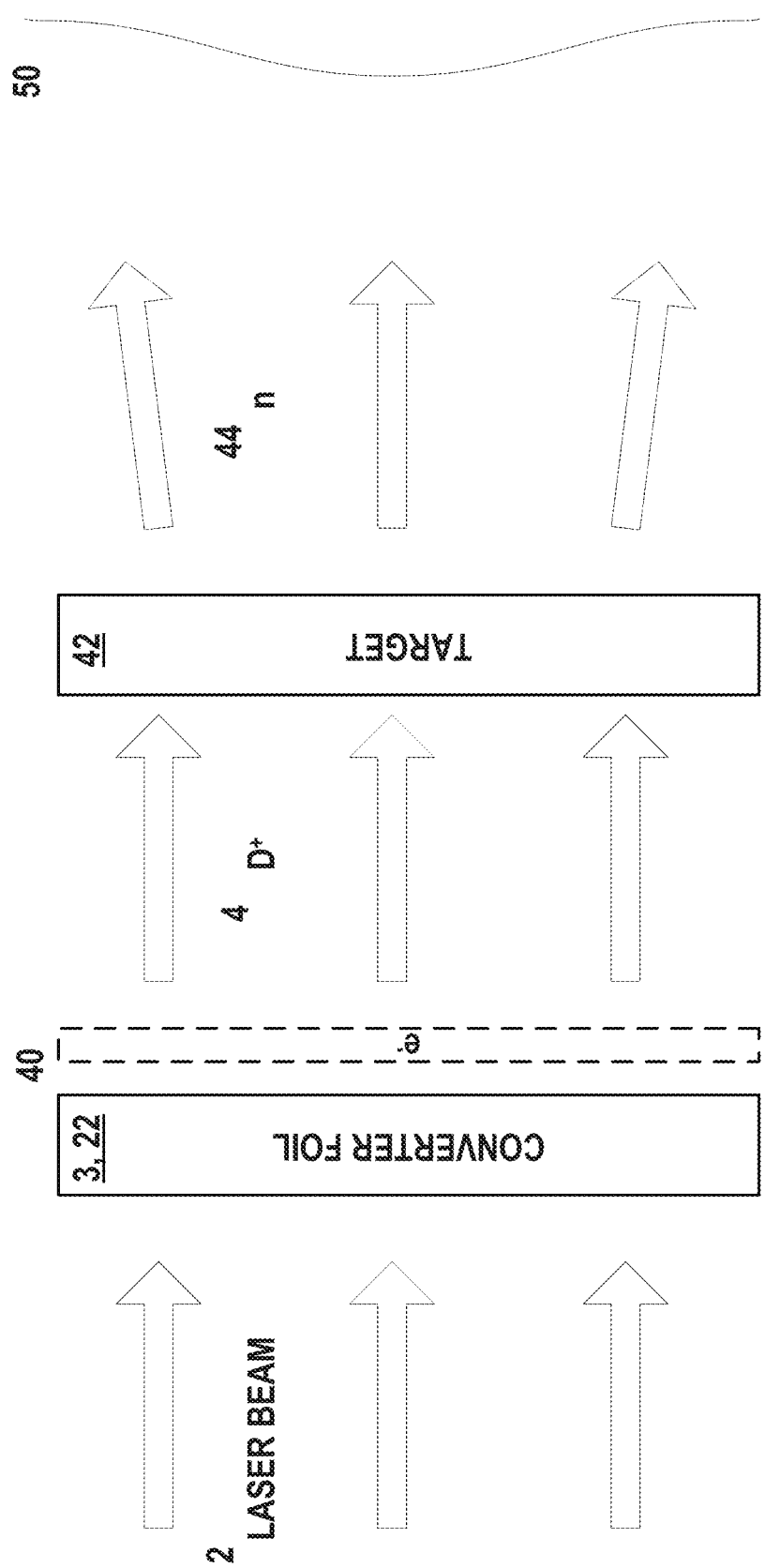
FIG. 5 is a block diagram showing the interaction of the laser beam, converter foil, deuterons, target, and neutrons.

As illustrated in FIG. 5, a pulsed high power laser beam 2 strikes the thin film 22 as a converter foil 3. As a result of being struck, a charged electron field 40 acting as a large sheet of negative charge is created in front (opposite face of the foil from the laser beam) that functions as a virtual cathode, which draws the positively charged deuteron ions 4 from the converter foil 3 and causes them to accelerate and bombard a second foil (or "target") 42 containing deuterium or tritium. Note that this target could also contain lithium or some other metal. In addition to the laser power and energy, the neutron yield and their energy will depend on the thicknesses of converter foils and the target foils, and the distance between these two different foils. Note that the laser must have sufficient peak intensity/power to drive the electrons out of the converter foil to operate correctly.

The target 42 could be a hydride-containing deuterium, deuterium-tritium, or tritium. A target using the deuterium-cluster foil could have a basic structure similar to the converter foil 3, i.e., be a deuterium-cluster foil, although, given the different functions of the converter 3 (laser pulse to deuterons) and the target (deuterons to neutrons), the actual structures may differ, e.g., in terms of the thickness and composition.

When the target 42 is thus bombarded with deuterons, the neutrons 44 thus produced have a highly directional distribution 50—although not a parallel angular distribution, the distribution roughly follows a cosine cubed angular distribution, which is a significant advance over the angular distribution. Thus the neutron angular distribution can be roughly represented by the cosine cubed law $E = I \cos^3 \theta / H^2$, where:

E=neutron energy at surface
I=neutron intensity at source
θ=angle between the horizontal axis and the neutron direction
H=distance of surface from source Deuterium-deuterium (D-D) reactions in the target 42 yield 2.45-MeV neutrons, and deuterium-tritium (D-T) reactions yield 14.1-MeV neutrons. This approach provides pulsed neutron intensities and angular distribution with advantageous properties over earlier approaches.

Table I, below, provides a comparison of some representative neutron source concepts along with the beam obtained with the laser D-cluster approach.

TABLE I

| | | | Reaction | Neutron energy (MeV) | Repetition rate (Hz) | P/D per pulse | Neutron yield per pulse |
|---|---|---|---|---|---|---|---|
| Neutron source | Dense plasma focus device | Battery powered table top unit | D-D | 2.4 | 1 | $1.21 \times 10^{16}$ D | $10^6$ neutrons |
| | | Coaxial accelerator | D-D | 2.5 | N/A | N/A | $10^{12}$ neutrons |
| | | Coaxial accelerator | D-T | 14 | N/A | N/A | $10^{15}$ neutrons |
| | Beam target interactions in high current diodes | | D-T | 14 | 1 | $6.25 \times 10^{17}$ 500 keV D | $4 \times 10^{13}$ neutrons |
| | Synchrotron accelerated beam-target interactions | JSNS/J-PARC/Japan | p-Hg | 5 | 25 | $1 \times 10^{14}$ P | $5.1 \times 10^{12}$ neutrons |
| | | SNS/ORNL/US Coupled hydrogen | p-Hg | N/A | 60 | $1.5 \times 10^{14}$ P | $4.2 \times 10^{12}$ neutrons |
| | | ISIS-TS2/RAL/UK Hydrogen/methane composite, grooved face | p-W | N/A | 10 | not available | $1.3 \times 10^{12}$ neutrons |
| | | ISIS-TS2/RAL/UK Hydrogen/methane composite, hydrogen face | p-W | N/A | 10 | not available | $4.0 \times 10^{12}$ neutrons |
| | Cluster type foils-Laser-accelerated D-beam-target reaction using cluster foils | | D-D, D-T, or D-Li | N/A | TBD (~1-60) | $>10^{16}$ D/pulse | $>10^{15}$ neutron/pulse for D-T neutrons, $>10^{13}$ neutron/pulse for D-D neutrons D-Li? |

Summary of Various Intense Neutron Sources

As to the dense plasma focus device, battery powered tabletop unit, see Rout, R. K. and et al., *Battery powered tabletop pulsed neutron source based on a sealed miniature plasma focus device*. Journal of Physics D: Applied Physics, 2008. 41(20): p. 205211. For the coaxial accelerator with D-D and D-T reactions, see Bernard, A., et al., *The dense plasma focus—A high intensity neutron source*. Nuclear Instruments and Methods, 1977. 145(1): p. 191-218. Regarding the beam target interations in high current diodes, see Ramirez, J. J., A. J. Toepfer, and M. J. Clauser, *Pulsed power applications to intense neutron source development*. Nuclear Instruments and Methods, 1977. 145(1): p. 179-183.

For the synchrotron accelerated beam-target interations, for the JSNS/J-PARC/Japan, see Maekawa, F., et al., *First neutron production utilizing J-PARC pulsed spallation neu-* tron source JSNS and neutronic performance demonstrated (hereinafter, Maekawa). Nuclear Instruments and Methods in Physics Research Section A: Accelerators, Spectrometers, Detectors and Associated Equipment. 620(2-3): p. 159-165. For the SNS/ORNL/US coupled hydrogen, see Maekawa and "Technical Parameters—SNS" http://neutrons-dev.ornl.gov/facilities/SNS/media/technical-parameters.pdf, downloaded Aug. 24, 2012. For the ISI-TS2/RAL/UK hygrogen/methane composit, both the grooved face and hydrogen face, also see Maekawa.

As can be seen from this table, a D-cluster facility can generate neutron source yields/pulse beam intensities much higher than the other methods. Some dense plasma focus yields are comparable but suffer electrode erosion and other problems. Lithium or other metals may be utilized as well, but at present these do not appear optimum, since higher beam energies are required. In addition the use of multi MeV deuteron ions, near the energy of the fusion reaction neutrons (versus keV ions in prior accelerator type experiments), as noted above, result in a distinct forward direction for the neutron reaction The estimated deuteron yield and energy in Table I is based on a 100-kJ laser with a 10% conversion efficiency. A larger laser with higher conversion efficiency can give a much larger deuteron yield and higher deuteron energy. This forward directionality adds to the efficiency by reducing neutron losses in undesired directions and reducing chamber shielding requirements. These features are especially important to homeland security integration applications. This new type of pulsed neutron source could bring in a whole new generation of facilities that would enable neutron irradiation experiments and integration capabilities not presently possible.

All of these neutron generation approaches face the problems of target heating and tritium (or deuterium) depletion in the target 42. A number of innovative concepts ranging from rotating targets to flowing metals have been considered for the target 42 to alleviate these problems. The present approach addresses this problem, based on ICF technology, by e.g., using an injection of "disposable" targets 42 into a reaction chamber where the neutrons are created. The main difference relative to injecting targets for an ICF fusion reactor is that, for neutron generation as a neutron source, an energy gain is not necessary. Thus, the target 42 does not need to be as sophisticated as that used in a fusion power plant.

While this system shares some common features with systems designed for FI fusion, the optimum deuterium beam spectrum for neutron production (versus hot spot heating, as required for fast ignition) is somewhat different. In this case, it is not necessary to focus and slow down the ions in a small volume. Rather, for a given target 42 design, beam interactions with deuterium or tritium in the target 42 are desired throughout its volume. Thus, it is desirable to provide a cluster converter foil 3 that has a deuteron beam energy distribution which gives a maximum neutron production per laser pulse.

FIG. 6 shows the known target system of the Rotating Target Neutron System (RTNS) 100' housed at the Lawrence Livermore National Laboratory (LLNL) and later moved to UC-Berkeley. In this design, a particle accelerator 60 is used to produce an energetic deuterium beam 4, and a rotating target 42 (multiple target pieces on a big fan wheel) with a water cooling system, including a cooling water supply 110 (e.g., 3 gallons/minute), a water spreader, 112, and a water catch cage 114, is used to dissipate the large amount of energy deposited in the target by the deuterium beam 4.

In an advantageous design variation of the RTNS 100 disclosed herein, the accelerator 60 is replaced by the high-energy laser and associated beam 2 with a cluster type converter foil 3, 22, creating a D-ion beam 4 focused on the target 42. This design allows much higher deuteron beam fluxes, providing significantly higher neutron production rates.

As is the case for the known RTNS 100', in the present embodiment of the neutron system 100, beam heating of the target 42 represents a major technology problem. This issue is even more challenging in the present case with the higher deuterium beam 4 intensity. Thus, when using the new cluster-type foil 3, 22, adequate cooling must be incorporated into the foil. Various mechanisms could be incorporated for avoiding the heating problem with the foils beyond that shown in FIGS. 6 and 7. For example, a film-reel-type system might be utilized where the film flexibility permits warping around a cylindrical form.

However, for film designs in which the film is brittle, such a reel-type system might string together a plurality of foil holders in series, the individual holders themselves being rigid, but the series of holders being flexible and wrapable around a reel cylinder. In other designs, a holder that permits targets to be dropped in and dropped out at approximately a 1 Hz interval could be utilized (the frequency being dependent on characteristics of the foil itself and its size and shape)—a catcher could be used to hold the used pieces. Such holders could also be used for flexible film as well. The holders could be designed similar to slide-film holders used to house slides in a film projector, although the film may or may not be bounded on all sides.

FIGS. 8 and 9 illustrate two possible designs for utilizing a large number of targets. In FIG. 8, both the cluster-type foil 22 and the targets 42 are implemented on the edges of a rotating pin wheel 120 so that they can be rotated into and out of the respective beams 2, 4 quickly. FIG. 9 illustrates a design in which both the cluster-type foil 22 and the targets 42 are dropped into the respective beams 2, 4 using a guide tube 120.

Figure 10:
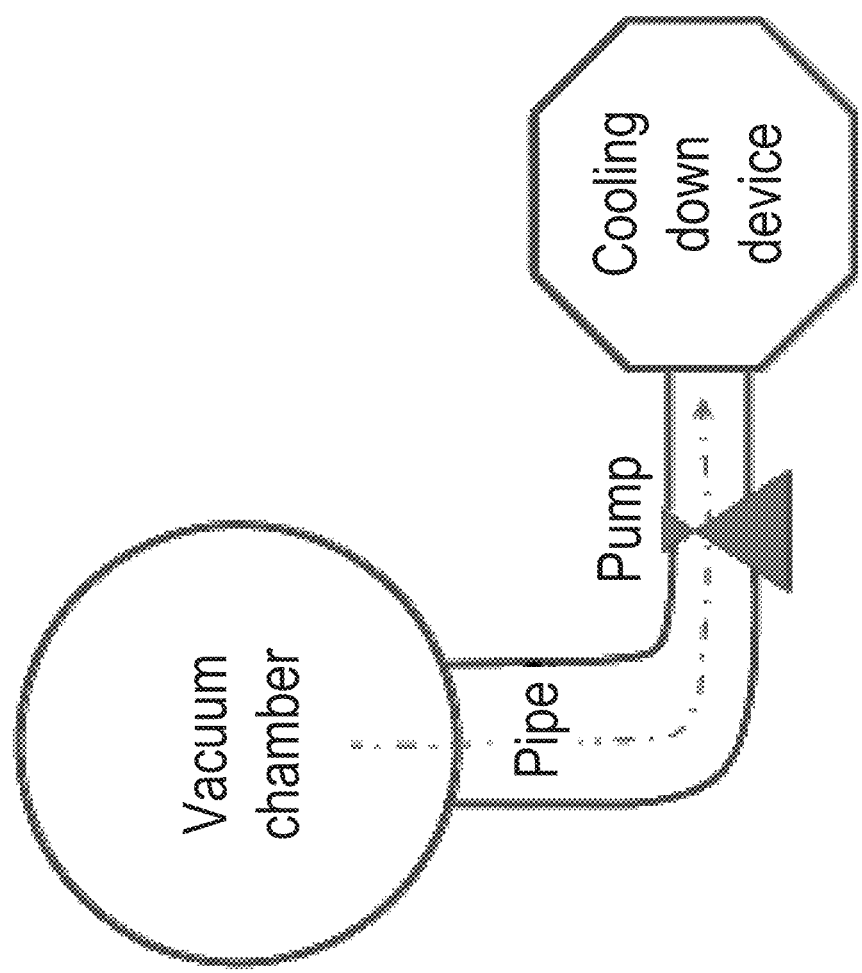
FIG. 10 is a pictorial block diagram illustrating the cooling operation.

Besides rotating targets 42, studies of pulsed neutron sources using accelerator-target facilities have considered flowing liquid metal targets (such as lithium fluoride) and plasma targets to handle the heat load. One problem with the plasma targets, however, is the low density of the targets, meaning the plasma cylinders must be somewhat long. FIG. 10 provides an example for collecting used cluster foil by pumping out, and subsequently cooling down and condensing, the produced metal plasma, wherein the a pumping rate impacts the neutron pulse repetition rate—this is because of the need to clear the chamber in order to avoid interference with the deuteron beam.

As noted above, the cluster foils used as a converter can be used as a target as well. This could be used in the rotating target configuration. Advantages of this are that, in the cluster foils, clusters do not diffuse out at lower temperatures. They can be designed so that they stay cool enough that avoids the problem of the target material diffusing out. With this design, it is possible to run the system much longer before having to replace the target because the cluster binding energy is significantly higher than that for D or T hydrides in other conventional targets. Thus, diffusive losses from cluster type targets heated up to 700° C. are much less than prior conventional targets. This allows longer times before the target 42 must be replaced due to D or T depletion.

The materials used in the cluster foil would likely vary when used as a converter foil 22 vs. a target 42, since the principles of operation are quite different. For the deuterons, the foil thickness is determined by the laser mechanism that drives the electrons out and that forms the virtual cathode that pulls the ions out. But the target should be thick enough so that the deuterons enter the target, but they are all stopped inside of the target material and fuse as they are stopped in the material. So for the target, it is the stopping path of the deuteron that is considered for an energy, e.g., of ~10 MeV.

In any case, spent target and or converter foil material could be collected and recycled. The depleted material can be collected in a manner described above and returned to a processing area where the material could be recharged with deuteron or proton clusters in a manner described in one of the related patents/applications.

Neutron sources are net consumers of energy so the appropriate figure of merit is the cost ($) per neutron delivered to the object under study. Although the ICF power plant target approach itself might provide an intense neutron source, it would involve a complex reactor type chamber and subsystems, and pose access problems for experiments. Therefore, a simplified target and chamber design is desirable for a practical neutron source facility that would enable implementation of such facilities much earlier than a full power plant neutron source. The use of a Petawatt laser having a high repetition rate directed at the D-cluster foil targets create the high neutron yield, forward directionality, and high repetition rate that enable a new class of neutron irradiation experiments.

Figure 11:
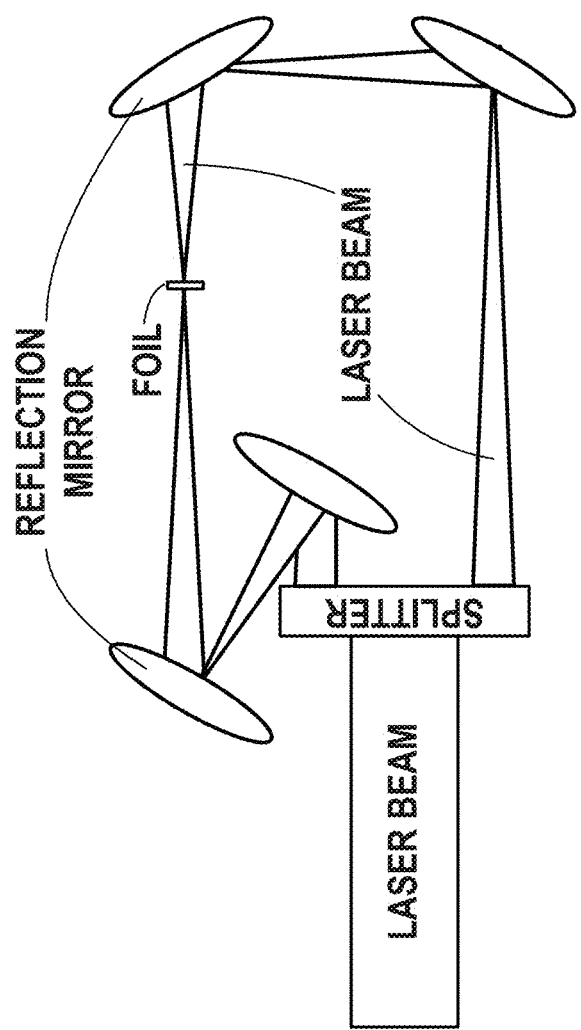
FIG. 11 is a pictorial block diagram illustrating another embodiment for producing neutrons.

Although the above-described embodiments provide one particular way of producing neutrons that have a high forward directionality, and alternate embodiment is presented in FIG. 11, which produces neutrons isotropically.

In this design, the D-cluster foil is compressed by two laser beams striking the foil on both its back and front sides simultaneously. The laser is fired into a beam splitter in order to be split into two beams. Both of beams travel through orientation and focusing reflection mirrors to insure a matching time interval before they irradiate the foil on both front and back side. The dense clusters are compressed to a point where they undergo fusion reactions, e.g., for deuterium clusters, D-D reactions will occur, producing 2.45 MeV neutrons. Alternately deuterium-tritium clusters undergo D-T reactions providing 14 MeV neutrons. The resultant neutrons produced, unlike those where a deuteron beam is generated to hit a target, are emitted isotropically.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

| TABLE OF REFERENCE CHARACTERS | |
|---|---|
| 1 | fast ignition (FI) fusion system |
| 2 | high energy (e.g., petawatt) laser (beam) |
| 3, 3' | converter foil |
| 4' | energetic ion beam (protons) |
| 4 | energetic ion beam (deuterons) |
| 6 | hot spot |
| 8 | fuel pellet |
| 9 | Cavity |
| 10 | primary driver |
| 11 | target shield |
| 12 | Converter |
| 20 | multilayer thin film device |
| 22 | thin film |
| 24 | base/substrate |
| 26 | multilayer thin film stack |
| 28 | alternating inner layers |
| 30 | Interface |
| 40 | charged electron field |
| 42 | target/plate |
| 44 | Neutrons |
| 50 | cosine cubed distribution |
| 60 | particle accelerator |
| 100, 100' | rotating target neutron system |
| 110 | water supply |
| 112 | water spreader |
| 114 | water catch cage |
| 120 | pin wheel |
| 130 | guide tube |

What is claimed is:

1. A method for producing neutrons, comprising:
providing a converter foil comprising deuterium clusters;
focusing a laser on the converter foil with power and energy sufficient to cause deuteron ions to separate from the converter foil; and
striking a surface of a target with the deuteron ions from the converter foil with energy sufficient to cause neutron production by a reaction selected from the group consisting of a D-D fusion reaction, a D-T fusion reaction, a D-metal nuclear spallation reaction, and a p-metal reaction.

2. The method of claim 1, wherein the converter foil is metallic.

3. The method of claim 1, wherein the target is metallic.

4. The method of claim 1, wherein the converter foil is a cluster type foil containing at least one of D and T clusters that produces deuteron ions.

5. The method of claim 1, wherein the target foil is a cluster type foil containing at least one of D and T clusters that produces neutrons.

6. The method of claim 1, wherein the deuteron ion beam energy causes fusion reactions in the target and produces a neutron source with an angular distribution substantially biased in a forward direction opposite an ion beam side.

7. The method of claim 6, wherein the angular distribution is substantially a cosine cubed function.

8. The method of claim 1, further comprising:
repetitively delivering a plurality of targets to a chamber in which the striking operation takes place.

9. The method of claim 8, wherein the repetitive delivering comprises providing the plurality of targets utilizing a pin-wheel wherein the targets are provided on outer arms of the pin-wheel.

10. The method of claim 8, wherein the repetitive delivering comprises providing the plurality of targets utilizing a guide tube.

11. The method of claim 1, further comprising:
subsequently cooling down and condensing metal plasma from the target produced as a result of the striking operation, wherein a pumping out rate of the plasma debris impacts a neutron pulse repetition rate to minimize debris interference with the D beam transport to the target.

12. The method of claim 11, further comprising:
collecting used target material by pumping out a chamber in which the striking operation takes place.

13. The method of claim 12, further comprising:
recycling the collected target material and recharging it with deuterium clusters.

14. A method for producing neutrons, comprising:
providing a converter foil comprising proton clusters;
focusing a laser on the converter foil with power and energy sufficient to cause proton ions to separate from the converter foil; and
striking a surface of a target with the protons from the converter foil with energy sufficient to cause neutron production by a proton-metal reactions.

15. The method of claim 14 wherein the proton-metal reaction is a proton-metal nuclear reaction.

16. The method of claim 14, wherein the converter foil is metallic.

17. The method of claim 14, wherein the target is metallic.

18. The method of claim 14, wherein the converter foil is a cluster type foil containing at least one of D and T clusters that produces a deuteron or, respectively, tritium ion beam.

19. The method of claim 14, wherein the target foil is a cluster type foil containing at least one of D and T clusters or a mixture of the two that interacts with the incoming ion beam to produce neutrons.

20. The method of claim 14, wherein the proton ion beam energy causes fusion reactions in the target and produces a neutron source with an angular distribution substantially biased in a forward direction opposite an ion beam side.

21. The method of claim 20, wherein the angular distribution is substantially a cosine cubed function.

22. The method of claim 14, further comprising:
repetitively delivering a plurality of targets to a chamber in which the striking operation takes place.

23. The method of claim 22, wherein the repetitive delivering comprises providing the plurality of targets utilizing a pin-wheel wherein the targets are provided on outer arms of the pin-wheel.

24. The method of claim 22, wherein the repetitive delivering comprises providing the plurality of targets utilizing a guide tube.

25. The method of claim 14, further comprising:
subsequently cooling down and condensing metal plasma from the target produced as a result of the striking operation, wherein a debris pumping out rate of the plasma impacts transport of the incoming ion beam and a neutron pulse repetition rate.

26. The method of claim 25, further comprising:
collecting used target material by pumping out a chamber in which the striking operation takes place.

27. The method of claim 26, further comprising:
recycling the collected target material and recharging it with deuterium clusters.

28. A method for assembling a plurality of target assemblies for a target injector, comprising:
producing a plurality of targets comprising at least one of deuterium and proton clusters;
affixing a holder to each of the plurality of targets;
attaching each holder to an end of an arm; and
assembling a plurality of the arms to extend from a central attachment portion in a pin-wheel manner.

29. A method for assembling a plurality of target assemblies for a target injector, comprising:
producing a plurality of targets comprising at least one of deuterium and proton clusters;
affixing a holder to each of the plurality of targets; and
providing a guide tube through which the plurality of holders are configured to be provided to the target injector.

30. A method for producing neutrons, comprising:
splitting a laser beam into a first beam and a second beam;
striking a first surface of a target with the first beam, and an opposite second surface of the target with the second beam with energy sufficient to cause neutron production by a reaction selected from the group consisting of a D-D fusion reaction, a D-T fusion reaction, a D-metal nuclear spallation reaction, and a p-metal reaction.

31. The method of claim 30, wherein the target contains at least one of D, T, or D-T clusters that produces D-D or D-T neutrons due to compression of the target.

32. The method of claim 30, wherein the neutrons are produced with an isotropic angular distribution.

33. The method of claim 30, wherein the laser beam is further split into one or more additional even pairs of laser beams.

34. The method of claim 33, wherein the additional even pairs of laser beams are arranged to improve uniformity of irradiation and compression of the target.

35. The method of claim 30, wherein the splitting of the laser beam utilizes mirrors, the method further comprising: arranging the mirrors so that the first beam and the second beam arrive at the target simultaneously.

* * * * *